United States Patent Office 3,766,184
Patented Oct. 16, 1973

3,766,184
PROCESS FOR THE CATALYTIC AMINATION OF ALIPHATIC ALCOHOLS, AMINOALCOHOLS AND MIXTURES THEREOF
Jarl Johansson, 15 Vallmovagen, and Jan Tornquist, 2 Vitmossevagen, both of Stenungsund, Sweden
No Drawing. Continuation-in-part of applications Ser. No. 678,551, Oct. 27, 1967, and Ser. No. 75,259, Sept. 24, 1970, both now abandoned. This application Apr. 5, 1971, Ser. No. 131,413
Claims priority, application Sweden, Dec. 30, 1966, 18,030/66
Int. Cl. C07d 51/70
U.S. Cl. 260—268 SY        13 Claims

ABSTRACT OF THE DISCLOSURE

A process is provided for the amination of aliphatic alcohols and aliphatic aminoalcohols and mixtures thereof to aliphatic amines and piperazine and aminoalkyl piperazines, using an amination catalyst composed of iron and nickel and/or cobalt.

---

This application is a continuation-in-part of Ser. No. 678,551, filed Oct. 27, 1967 and of Ser. No. 75,259, filed Sept. 24, 1970, both now abandoned.

U.S. Pats. 2,349,222, 2,398,500 and 2,078,992 disclose that alcohols can be converted to amines by reaction with ammonia in the presence of dehydrating catalysts, such as aluminum oxide, bauxite, and silica gel. However, the reaction requires very high temperatures, of the order of, for instance, from 300 to 400° C. At such high temperatures the danger of forming byproducts is very great, owing to the competitive dehydation of the alcohol to olefin. Moreover, such temperatures are unsuitable for the preparation of heat-sensitive amines, which are easily converted under these conditions to more stable heterocyclic products. According to German Pat. No. 701,825, 1,4-butanediol is converted in good yield to pyrrolidine, and not to 1,4-diaminobutane, in the presence of an aluminum oxide-thorium oxide catalyst at 300° C.

Aliphatic alcohols can also be converted to amines by reaction with ammonia in the presence of hydrogenation catalysts, such as metallic nickel, cobalt, copper, and ruthenium. Normally these reactions can be carried out at a lower temperature in the presence of hydrogenation catalysts than in the presence of dehydrating catalysts. Thus, U.S. Pats. Nos. 2,861,995 and 3,112,318 describe the catalytic conversion of ethylene diamine by reaction with ammonia in the presence of a Raney nickel catalyst at 150 to 250° C. Considerable quantities of heterocyclic by-products are formed even in these processes. U.S. Pat. No. 2,754,330 describes amination of glycols and aminoalcohols at 150 to 250° C., using ruthenium catalysts, but states that a starting material having less than six carbon atoms gives a high proportion of cyclic by-products. The formation of substantial amounts of by-products when carrying out these processes indicates that an efficient and economical industrial preparation of, for instance, ethylenediamine from ethanolamine or ethylene glycol, cannot as yet be realized. In the commercial preparation of these products, it has been necessary, therefore, to apply manufacturing methods based on dichloroethane or aminoacetonitrile as a starting material. The disadvantages of these methods are well known in the art, particularly the problem of corrosion caused by the hydrogen chloride released by the reaction between dichloroethane and ammonia, and the difficulty of recovering the product from the diluted salt-containing aqueous solutions which are obtained. In the latter process, the hydroxyacetonitrile starting material is expensive, and the intermediate products formed are unstable and require complicated and large apparatus for proper handling.

The conditions for producing ethylenediamine from ethanolamine or ethylene glycol by means of an economical industrial process require, firstly, a sufficiently active catalyst, i.e. a catalyst which gives a high yield of ethylinediamine without forming troublesome amounts of heterocyclic and other by-products, and secondly a catalyst whose properties are suitable from the technical aspect, i.e., the catalyst is easy to prepare, has a long effective life, and has good resistance to attrition.

U.S. Pat. No. 3,068,290 describes a catalyst for producing ethylenediamine from ethanolamine and ammonia which fulfills one of these two criteria, and comprises a mixture of metallic nickel and magnesium oxide. It is produced by thermal decomposition of a mixture of nickel formate and magnesium formate, or the corresponding oxalates to the oxides, followed by reduction of the oxides in a hydrogen atmosphere. These catalysts are superior to previously known catalysts in the yield of ethylenediamine obtained. However, it has been shown that this type of catalyst does not possess the properties from the technical aspect which would make it suitable for use on an industrial scale, i.e., it is not easy to produce, and it does not have a long effective life or a good mechanical strength. Its activity is largely dependent on how it is prepared. If one starts with an oxalate, a catalyst is obtained which has a much lower amination capacity than if nickel magnesium oxide catalyst were produced from a formate, by precipitation from aqueous solutions of nickel formate and magnesium formate. Depending upon the difference in water-solubility of the formates, the amination activity will depend upon the manner in which evaporation of the aqueous solution is effected. The best result is obtained if a saturated solution is added at the same rate as the water is evaporated.

The catalyst is obtained as a very finely grained powder, and consequent handling of the same in an industrial process requires special means to separate the catalyst on the termination of the reaction. Consequently, in the case of a continuous process a catalyst in tablet or pellet form is to be preferred. This is produced either by impregnating an inert carrier, such as pumice stone, silica or various forms of diatomaceous earth, with solutions of the catalytic-acting metal salts, or also by compressing the metal compounds into tablet form, optionally in the presence of an inert carrier. However, the impregnation of a carrier with nickel and magnesium formate is made difficult by the aforesaid differences in solubility between the salts.

It is possible to produce a catalyst of this type in tablet form by compressing the nickel and magnesium oxides obtained by evaporation the formates and the subsequent thermal decomposition, but the activity of this catalyst, similar to that of the powdered one, is greatly dependent upon the manner in which evaporation is effected, and its manufacture is complicated. However, the most serious disadvantage associated with the nickel-magnesium oxide catalyst is its limited chemical stability.

In the case of the conditions necessary for producing 2,3-diaminobutane from butanediol-2,3, for instance, considerable amounts of metallic nickel are released by the reaction mixture, which results in reduction in the effective life.

Indeed, it is recognized in German Pat. No. 1,172,268 that the effective life of a nickel-magnesium oxide catalyst is unsatisfactory. This German patent discloses the use of a cobalt catalyst produced by sintering and subsequent reduction of cobalt oxide. This catalyst has an extremely low degree of activity and is not satisfactory for use in the amination of alcohols.

U.S. Pat. No. 3,120,524 to Godfrey dated Feb. 4, 1964 relates to a method for preparing N-alkyl substituted piperazines by contacting an amine with a hydrogenation catalyst in the presence of hydrogen at an elevated temperature and pressure. Hydrogenation catalysts which can be employed in the Godfrey method include metals and oxides of copper, nickel and cobalt, including mixtures thereof, and if desired, promoted with a normally non-reducible metal oxide, such as oxides of chromium, aluminum, iron, calcium, magnesium, manganese, and the rare earths. Preferred catalysts are the mixed nickel, copper and chromium oxide catalysts. Godfrey teaches using a chromium promoter in an amount ranging from 1 to 6%. He does not teach employing a significant proportion of iron in his catalyst, such as at least 10%.

In accordance with the instant invention, a process is provided for the amination of saturated aliphatic aliphatic alcohols and saturated aliphatic mixtures thereof to aliphatic amines, and piperazine and amino alkyl piperazines by reaction of the alcohols with ammonia, using an amination catalyst consisting essentially of iron and nickel and/or cobalt.

When this catalyst is employed in the amination of alcohols, higher yields of the desired products are obtained, and the formation of undesirable by-products is greatly reduced, as compared to aminations carried out employing the prior art catalysts disclosed hereinbefore. It has been found that when combinations of the iron and nickel and/or cobalt catalyst is used in the amination of alcohols, greater yields of desired product are produced than when nickel and/or cobalt materials are employed alone, without the iron. Thus, it appears that the iron greatly enhances the performance of the nickel and/or cobalt as a catalyst in the amination of alcohols. This is especially surprising inasmuch as iron catalysts alone or in combination with a carrier have substantially no catalytic effect in the amination of alcohols with ammonia, such as in the amination of ethanolamine with ammonia to produce ethylenediamine.

The iron and nickel and/or cobalt catalysts of the invention can take the form of a mixture of metallic iron and metallic nickel and/or metallic cobalt. Such a catalyst composition can be produced by reduction of the corresponding oxides, and can be used in powder form or in the form of compressed or impregnated tablets. In addition, the metals can be present as the metal oxides or a mixture of one or more metals with one or more oxides. The oxides may be reduced to the metal in the course of the amination reaction, due to the presence of hydrogen.

The proportions of iron and nickel and/or cobalt in the catalyst composition can vary widely. In order to obtain a catalyst with the high amination activity required in this invention, the iron content should be at least about 10 percent of the total content of the metals. Generally, the Fe:Ni/Fe:Co/Fe:Ni+Co atomic ratios can range from about 10:90 to about 90:10. However, optimum activity appears to be obtained at Fe:Ni/Fe:Co/Fe:Ni+Co atomic ratios within the range from about 75:25 to about 25:75 and preferably about 1:1.

The catalyst composition can be employed without a support or carrier, and will display excellent activity. It also can be combined with a support or carrier material. The amount of carrier material employed is not critical, and can vary widely, depending upon the process conditions employed. Generally, from about 10 to about 95% of the support by weight of the entire catalyst composition can be employed.

If the catalyst composition is employed in the amination of alcohols employing a batch process, a pulverized catalyst comprising a mixture of the metals without any carrier can be used. However, if a continuous amination process is employed, it is preferably to employ a catalyst composition in a fixed or fluid bed which comprises from about 40 to about 95% by weight of a support or carrier.

Any known carrier or support materials can be employed, such as, for example, silica, alumina ($Al_2O_3$), zirconia, silicon carbide, alundum, alumina-silica, and the inorganic phosphates, silicates, aluminates, borates and carbonates stable under the reaction conditions to be encountered in the use of the catalyst. Alumina is preferred. A particularly preferred catalyst composition for use in continuous amination processes comprises a mixture of iron oxide, nickel oxide and cobalt oxide on an aluminum oxide carrier. Such a catalyst in the form of a tablet has good mechanical and chemical stability.

The catalyst metal oxides can be prepared from the nitrates by melting the nitrates and heating the metal while stirring until the water of crystalization, if any, of the nitrates has evaporated, and thereafter heating the residue, which has almost a solid consistency, to a temperature within the range from about 100 to about 1000° C. and preferably from about 300 to about 800° C. in the presence of oxygen, to form the corresponding metal oxides. The mixture of metal oxides as obtained can be employed as the catalyst in the amination of alcohols. If desired, however, the metal oxides can be reduced with hydrogen to form a mixture of the elemental metals, namely, iron, nickel and/or cobalt, which can then be employed as the catalyst in the amination of alcohols.

The catalyst composition can also be formed from the oxides of iron, nickel and/or cobalt by blending these oxides together, or each of the oxides can be formed separately and then blended, or formed separately or together in situ.

As starting materials for the iron component, for example, there can be used ferrous nitrate or ferric nitrate, and any of the iron oxides such as ferrous oxide, ferric oxide or $Fe_3O_4$. The starting materials for the nickel component can be nickelous or nickelic nitrates and oxides. The starting materials for the cobalt component can be cobaltous and cobaltic nitrates or oxides. However, it is to be understood that the above-mentioned starting materials are merely illustrative, and that any iron, nickel and cobalt compound that is decomposable to the elemental metal or oxide can be employed to produce metallic iron, nickel, and cobalt and the oxides of the same suitable for use in the catalyst of the invention.

The process provided in accordance with the instant invention for the catalytic conversion of aliphatic alcohols and aminoalcohols, and mixtures of aliphatic alcohols and aminoalcohols to aliphatic and heterocyclic amines by reaction with ammonia comprises carrying out the reaction in the presence of hydrogen and in the presence of a catalyst composition consisting essentially of iron and nickel and/or cobalt. This process can be carried out as a batchwise process or as a continuous process.

Aliphatic alcohols which can be aminated in the process of the instance invention include the saturated aliphatic monohydric and polyhydric alcohols having from one to about thirty carbon atoms, including, for example, saturated monohydric alcohols having from one to about thirty carbon atoms, such as methanol, ethanol, propanol, isopropanol, n-butanol, sec-butanol, isobutanol, tert-butanol, n-pentanol, isopentanol, neopentanol, n-hexanol, isohexanol, 2-ethyl hexanol, n-heptanol, tert-octanol, n-octanol, octanol-2, isooctanol, tert-octanol, n-nonanol, n-decanol, n-dodecanol, n-hendecanol, n-tridecanol, n-tetradecaol, isotetradecanol, n-pentadecanol, n-hexadecanol, n-heptadecanol, n-octadecanol, arachidyl alcohol, behenyl alcohol, lignoceryl alcohol, montanyl alcohol, aliphatic dihydric alcohols having from two to about thirty carbon atoms, such as ethylene glycol, diethylene glycol, triethylene glycol, tetraethylene glycol, propylene glycol and 1,2-butanediol pentanediol-1,7, octanediol-1,8, nonanediol-1,9, decanediol-1,10, hendecanediol-1,11, dodecanetiol1,12, tridecanediol-1,13, tetradecanediol-1,14, pentadecanediol-1,15, hexadecanediol-1,16, octadecanediol-1,18, eicosanediol-1,20, decosanediol-1,22, tetracosanediol-1,24, hexacosanediol-1,26, octacosanediol-1,28, polyethyleine glycol of 400 molecular weight, polyethylene glycol of 450 molecular weight, polyethylene glycol of 200 molecular weight, and trihydric and higher polyols having from about three to about thirty carbon atoms, such as glycerol, erythritol, penetaerythritol, corbitol, mannitol, trimethylol ethane, trimethylol propane, dulcitol, heptanetriol, decanetriol, trimethylol octane, triethylol eicosane, hexamethylol tetracosane, hexanemethylol docosane, and nonacosanetriol, and aliphatic aminoalcohols having from about two to about thirty carbons, such as monoethanolamine, diethanolamine, triethanolamine, aminoethyl ethanolamine, propanolamine, butanolamine, pentanolamine, decanolamine, hexanolamine, heptanolamine, octanolamine, dodecanolamine, tetradecanolamine, hexadecanolamine, octadecanolamine, eicosanolamine, tricosanolamine, hexacosanolamine, nonacosanolamine, and tetracosanolamine. In addition, mixtures of the above alcohols can be employed, such as, for example, mixtures of ethylene glycol and monoethanolamine, or the mixtures of aminoalcohols which are obtained on reaction between ethylene oxide and ammonia.

The ammonia employed for reaction with the alcohol need not be free from water, although dry ammonia is preferred. In addition, ammonium hydroxide can also be employed. Normally, an excess of ammonia is employed, in order to obtain a high yield of the amine. The molar ratio of ammonia to the alcohol present in the reaction mixture should be at least stoichiometric, and can be within the range from about 1:1 to about 20:1, preferably within the range from about 8:1 to about 12:1, for example, 10:1.

The reaction between the ammonia and the alcohol is carried out with ammonia in the presence of hydrogen gas, in order to ensure a good yield of the desired aliphatic amine product. The hydrogen can reduce a catalyst initially present as the oxides to the elemental metals. The ammonia should be in a relatively high proportion in the mixture, for example, within the range from about 50 to about 95% ammonia, and preferably within the range from about 70 to about 95% ammonia. Generally, the quantity of hydrogen gas required is relatively small, and corresponds to a proportion of from about 2 to about 30%. Higher proportions of hydrogen can be employed, but generally, however, without any noticeable benefit.

In carrying out the amination process, an elevated temperature should be employed. Temperatures within the range from about 150 to about 350° C. are suitable. Particularly good yields are obtained employing temperatures within the range from about 200 to about 275° C.

The reaction of the ammonia and the alcohol in the presence of the catalyst should be carried out at a relatively high pressure. The pressure employed is dependent upon the molar ratio of ammonia to alcohol, the reaction temperature, the concentration of ammonia in the system, the amount of hydrogen, and the kind of operation. Generally, the pressure should be high enough to keep most of the ammonia in the liquid phase. The pressure is normally within the range from about 80 to about 400 atomspheres, and preferably from 100 to about 350 atmospheres.

The equipment used in carrying out the amination process of this invention can be any conventional high temperature pressure equipment adapted for batch or continuous operation. For example, in a batch process a pressure reactor vessel can be used, such as an autoclave equipped with an agitator and heating means. The process can be carried out as a continuous process, wherein the reactants in gas or liquid phase are passed under pressure over a solid catalyst bed maintained at the desired reaction temperature. The catalyst can also be in a fluid bed, and passed countercurrently to the reaction mixture. The reaction mixture is worked up by separating the ammonia and then the various products by fractional distillation.

The following examples in the opinion of the inventors represent preferred embodiments of their invention.

EXAMPLE 1

A Ni/Co/Fe catalyst on $Al_2O_3$ was prepared as follows. A mixture of nickel nitrate, cobalt nitrate, iron nitrate and aluminum nitrate having an atomic ratio as the metal of 1:1:1:8, respectively, was melted in a crucible. The nitrates melted in their own water of crystallization. The melt was heated with agitation until the water had evaporated, and the residue assumed an almost solid consistency. The melt was then placed in a furnace and converted to the oxides by heating at 800° C., in the presence of air for about three hours. The mixture of metal oxides was reduced with hydrogen gas at 400° C. for four hours to form the catalyst which was then employed in the amination of monoethanolamine as set out below.

29 g. (0.475 mol) of monoethanolamine and 37 g. (2.1 mols) of water were charged into a 300 ml. autoclave of acid-proof steel, constructed for a maximum pressure of 350 atmospheres and provided with magnetic agitating means, internal cooling loop and sample outlet tube. The air in the autoclave was displaced with nitrogen gas and 7 g. of previously prepared reduced catalyst

was added. After introducing the catalyst the autoclave was closed and 81 g. (4.75 mols) of water-free ammonia was introduced into the autoclave, through the sampling valve. Hydrogen gas was then introduced until the pressure of the autoclave rose from approximately 6 to 50 atmospheres. The contents of the autoclave was then heated with stirring to the reaction temperature of 225° C., whereupon the pressure rose to 150 atmospheres. When the reaction temperature of 225° C. was reached, a sample of the reaction mixture was taken. The mixture was then heated and agitated for an additional five hours at 225° C. A fresh sample of approximately 2 ml. was taken each hour. After five hours, the reaction was halted. The samples were centrifuged to remove traces of catalyst, and weighed. Ethanol was added to the samples, in an amount corresponding to their weight (4.0 ml. per 5.0 g. sample), and 2.1 μl. of the obtained ethanol solution was analyzed by gas chromatography.

A Perkin-Elmer 800 Gas Chromatograph equipped with differential flame-ionization detector and double columns, 2 meters in length, was used for the gas chromatographic separation process. The filler material used in the columns was Chromosorb W impregnated with 3% KOH as a carrier, on which was deposited 10% Carbowax 20 M. Linear temperature programming between 100 and 200° C. with temperature gradient of 6.25° C./min. was used, and the flow of carrier gas comprised 80 ml. $N_2$/min. Calibration of the peaks of the chromatogram was made by analysis of mixtures of known composition. The degree of conversion and amounts of reaction products formed were calculated from the samples and are set out in Table I. The following designations have been used in Table I:

EDA=ethylenediamine
MEA=monoethanolamine
PIP=piperazine
AEEA=aminoethyl ethanolamine
AEP=aminoethyl piperazine
DETA=diethylenetriamine.

The cobalt catalyst described in Example I of German published specification 1,172,268, which is produced by sintering and subsequent reduction of cobalt oxide, was also prepared and used in the same process. However, it had such a low degree of activity that it was impossible to achieve a conversion of 40% under the conditions used.

EXAMPLE 6

A series of aminations of monoethanolamine was carried out essentially the same manner as described in Ex-

TABLE I

| Reaction time, in hours [1] | Converted MEA percent | Percent of charged MEA recovered as— | | | | | | |
|---|---|---|---|---|---|---|---|---|
| | | EDA | PIP | MEA | DETA | AEP | AEEA | Remainder |
| 0 | 4 | 3 | 0 | 96 | 0 | 0 | 1 | 0 |
| 1 | 34 | 25 | 4 | 66 | 0 | 0 | 4 | 0 |
| 2 | 52 | 37 | 8 | 48 | 0 | 1 | 6 | 0 |
| 3 | 68 | 41 | 14 | 32 | 1 | 2 | 8 | 1 |
| 4 | 80 | 44 | 22 | 20 | 0 | 4 | 10 | 0 |
| 5 | 84 | 43 | 25 | 16 | 2 | 5 | 7 | 1 |

[1] The reaction time was calculated in this and following examples starting from the time the reaction temperature had been reached.

After two hours, when approximately half of the charged amount of monoethanolamine had reacted, the selectivity with respect to ethylenediamine was approximately 70%. Selectivity decreased thereafter with increasing degree of conversion. The expression "selectivity" is used in this and following examples to indicate the mol percentage of monoethanolamine aminated to ethylenediamine.

EXAMPLES 2 TO 5

A series of control catalysts and catalysts exemplary of the invention were prepared in the manner described in Example 1, and a series of aminations of monoethanolamine were carried out with these catalysts, in the same manner as described in Example 1. The mole percent of converted ethylene diamine after 40% and after 60% conversion of monoethanolamine was determined from the product samples, as a gauge of selectivity, and is reported in Table II, below, which sets out the catalyst composition in each amination.

TABLE II

| Catalyst | Atomic ratio | Selectivity mol percent converted monoethanolamine | |
|---|---|---|---|
| | | After 40% conversion of monoethanolamine | After 60% conversion of monoethanolamine |
| Ex. No.: | | | |
| 2 ...... Ni/Co/Fe/Al$_2$O$_3$ | 1:1:1:3 | 65 | 60 |
| 3 ...... Co/Fe/Al$_2$O$_3$ | 1:1:2 | 69 | 62 |
| 4 ...... Ni/Fe | 1:1 | 70 | 62 |
| 5 ...... Ni/Fe/Al$_2$O$_3$ | 0.9:0.1:1 | 61 | 55 |
| Control: | | | |
| 1 ...... Fe/Al$_2$O$_3$ | 1:1 | | |
| 2 ...... Ni/Al$_2$O$_3$ | 1:1 | 54 | 52 |
| 3 ...... Co/Al$_2$O$_3$ | 1:1 | 50 | 48 |
| 4 ...... Ni/Co/Al$_2$O$_3$ | 1:1:2 | 51 | 50 |
| 5 ...... Ni/Fe/Al$_2$O$_3$ | 0.95:0.05:1 | 54 | 51 |

The selectivities which are given in Table II show that the catalysts which contain iron together with nickel and/or cobalt, Examples 2 to 5 in accordance with the instant invention, present a substantially higher selectivity for the formation of ethylene diamine than the catalysts which do not contain iron (controls 2 to 4). The catalyst Fe/Al$_2$O$_3$ (control 1) showed no catalytic activity whatsoever. Control 5 shows that Fe in the atomic ratio Ni:Fe 0.95:0.05 in the Ni catalyst of control 2 does not improve selectivity. The selectivities are essentially the same, showing that iron in this small proportion has no noticeable effect.

These results are to be compared with Example 5, where the atomic ratio Ni:Fe is increased to 0.9:0.1. Here, the selectivity is greatly increased, and begins to approach the selectivity of the other catalysts tested, Examples 2 to 4.

ample 1 with the exception that the aminations were carried out at 200° C. The selectivity for the Ni/Co/Fe/Al$_2$O$_3$ catalyst from Example 2 was compared with the previously known catalysts, nickel-magnesium oxide (control 6) and Raney nickel (control 7). The catalysts were charged in amounts so that the percentage of nickel and cobalt in the Ni/Co/Fe catalyst (Example 6) was equal to the percentage of nickel in the catalysts of controls 6 and 7. The percentage of converted monoethanolamine as formed ethylenediamine (selectivity) was calculated from the gas chromatographic analysis, and the results are set out in Table III below.

TABLE III

| Catalyst | Formed ethylenediamine [1] | |
|---|---|---|
| | 40% conversion | 60% conversion |
| Example 6 ...... Ni/Co/Fe/Al$_2$O$_3$ (1:1:1:3) | 70 | 62 |
| Control 6 ...... NiMgO | 59 | 47 |
| Control 7 ...... Raney Ni | 46 | 41 |

[1] Expressed in mol percent of converted monoethanolamine at 200° C.

Table III shows that the Ni/Fe/Co catalyst (Example 6) according to the invention is superior to the best of the prior art catalysts.

EXAMPLE 7

In a manner similar to that in Example 1, 75 g. (0.58 mol) of octanol-2 was aminated with 50 g. (2.9 mol) of water-free ammonia at 225° C. and 160 atmospheres in the presence of hydrogen gas and 7 g. of reduced Ni/Co/Fe/Al$_2$O$_3$ catalyst of Example 2. Gas chromatographic analysis showed that after one hour 88% of the octanol had been converted, and of this 95% had been aminated to 2-aminooctane.

EXAMPLE 8

In a manner similar to that in Example 1, 75 g. (0.40 mol) of lauryl alcohol was aminated with 50 g. (2.9 mols) of water-free ammonia at 225° C. and 170 atmospheres in the presence of hydrogen gas and 7 g. of reduced Ni/Co/Fe/Al$_2$O$_3$ catalyst of Example 2. Gas chromatographic analysis showed that after three hours 59% of the lauryl alcohol had been converted, and of this 95% had been aminated to dodecylamine.

EXAMPLE 9

In a manner similar to that in Example 1, 16 g. (0.18 mol) of butanediol-2,3 was aminated with 61 g. (3.6 mols) of ammonia and 61 g. of water at 200° C. and 90 atmospheres in the presence of hydrogen gas and 7 g. of reduced Ni/Co/Fe/Al$_2$O$_3$ catalyst of Example 2. Gas chromatographic analysis showed that after one hour 60% of the butanediol had been converted, and of this 50% had been aminated to 2,3-aminobutane.

EXAMPLE 10

In a manner similar to that in Example 1, 50 g. (0.48 mol) of diethanolamine was aminated with 81 g. (4.8 mols) of ammonia and 37 g. of water at 225° C. and 230 atmospheres in the presence of hydrogen gas and 7 g. of reduced catalyst in tablet form. The tablets to be reduced were comprised of 3 to 4% each of nickel oxide, cobalt oxide and iron oxide, and the remainder aluminum oxide. The tablets were shaped into cylinders 3.2 mm. in diameter, and then reduced with hydrogen gas to form the catalyst.

Gas chromatographic analysis showed that after one hour 26% of the diethyleneamine had been converted, of which 49% had formed aminoethyl ethanolamine, 36% piperazine, and 8% ethylenediamine. After five hours 82% of the diethanolamine had been converted, of which 16% had been aminated to aminoethyl ethanolamine, 60% to piperazine, and 10% to ethylenediamine.

EXAMPLE 11

100 g. (approx. 100 ml.) of the prereduced catalyst described in Example 10 was charged into a reaction vessel for a continuous process comprising a 100 cm. long tube of acid-proof steel having an inner diameter of 12.5 cm. and a wall thickness of 2.5 mm. The reaction tube was encased in oil-filled jacket in which was also provided a coiled preheating pipe for heating the charged starting material. The reaction vessel and preheating coil were heated to the required temperature by circulating and heating the oil.

43.6 g. of monoethanolamine, 15.4 g. of diethanolamine, 5.1 g. of triethanolamine, 152 g. of ammonia, and 69 g. of water were pumped by means of a metering pump each hour to the reaction vessel, via a gas tank filled with hydrogen gas. The gas tank firstly supplied hydrogen gas to the reaction mixture, and secondly softened the variations in pressure from the feed-in pump. The above mixture of ethanolamines corresponds to that which was obtained with the known reaction between ethylene oxide and ammonia at the mol ratio of ammonia/ethylene oxide of 10:1.

The mixture of starting materials was conveyed from the gas tank, via the heating coil to the reaction vessel in which the reaction temperature was maintained at 225° C. and the pressure about 200 atmospheres.

Gas chromatographic analysis of the reaction mixture showed that, among other things, 11 g. of ethylenediamine, 3 g. of piperazine, 3 g. of aminoethyl ethanolamine, 1 g. of diethylenetriamine, 27 g. of unreacted monoethanolamine, and 12 g. of unreacted diethanolamine were obtained per hour. The test also showed that separation prior to further amination is not necessary in the case of the alkanolamines obtained from the reaction between alkylene oxides and ammonia.

EXAMPLE 12

A Ni/Co/Fe catalyst on $Al_2O_3$ was prepared as follows. A mixture of nickel nitrate, cobalt nitrate, iron nitrate and aluminum nitrate having an atomic ratio as the metal of 1:1:1:8, respectively, was melted in a crucible. The nitrates melted in their own water of crystallization. The melt was heated with agitation until the water had evaporated, and the residue assumed an almost solid consistency. The melt was then placed in a furnace and converted to the oxides by heating at 800° C., in the presence of air for about three hours. The mixture of metal oxides was tabletted in cylinders 3.2 mm. in diameter, and reduced with hydrogen gas at 400° C. for four hours to form the catalyst.

64.3 g. (0.30 mol) of tetradecanol was charged into a 300 ml. autoclave of acid-proof steel, constructed for a maximum pressure of 350 atmospheres and provided with magnetic agitating means, internal cooling loop and sample outlet tube. The air in the autoclave was displaced with nitrogen gas and 7.5 g. of the previously prepared reduced catalyst (Ni/Co%Fe/$Al_2O_3$ 1:1:1:8) was added. After introducing the catalyst the autoclave was closed and 51.1 g. (3.0 mols) of water-free ammonia was introduced into the autoclave, through the sampling valve. Hydrogen gas was then introduced and the contents of the autoclave was then heated with stirring to the reaction temperature of 200° C., whereupon the pressure rose to 200 atmospheres. The mixture was then heated and agitated at 200° C. for six hours. Samples (2 ml.) were centrifuged to remove traces of catalyst, and weighed. Ethanol was added to the samples, in an amount corresponding to their weight (4.0 ml. per 5.0 g. sample), and 2.1 $\mu$l. of the obtained ethanol solution was analyzed by gas chromatography. 50% of the tetradecanol-1 had been converted, and of this 93% formed tetradecylamine.

EXAMPLE 13

81.2 g. (0.30 mol) of octadecanol-1 was charged into a 300 ml. autoclave of acid-proof steel, as in Example 12, the air in the autoclave was displaced with nitrogen gas, and 7.5 g. of the previously prepared reduced catalyst (Ni/Co/Fe/$Al_2O_3$ 1:1:1:8) of Example 12 was added. After introducing the catalyst the autoclave was closed and 51.1 g. (3.0 mols) of water-free ammonia was introduced into the autoclave, through the sampling valve. Hydrogen gas was then introduced, and the contents of the autoclave was then heated with stirring to the reaction temperature of 200° C., whereupon the pressure rose to 2000 atmospheres. The mixture was then heated at 200° C. and agitated for five hours. Gas chromatographic analysis showed 40% of the octadecanol-1 had been converted, and of this, 95% formed primary octadecylamine.

EXAMPLE 14

127.5 g. (0.30 mol) of nonacosanol-1 was charged into a 300 ml. autoclave of acid-proof steel as in Example 12, the air in the autoclave was displaced with nitrogen gas and 7.5 g. of the previously prepared reduced catalyst (Ni/Co/Fe/$Al_2O_3$ 1:1:1:8) of Example 12 was added. After introducing the catalyst, the autoclave was closed and 51.1 g. (3.0 mols) of water-free ammonia was introduced into the autoclave, through the sampling valve. Hydrogen gas was then introduced, and the contents of the autoclave was then heated with stirring to the reaction temperature of 200° C., whereupon the pressure rose to 200 atmospheres. The mixture was then heated at 200° C. and agitated for five hours. Gas chromatographic analysis showed 38% of the nonacosanol had been converted, and of this 94% formed primary nonacosylamine.

EXAMPLES 15 AND 16

Two experiments were made in a reactor for continuous, plug flow operation. The reactor tube was made of stainless steel, length 250 cm., inner diameter 4 mm. It contained 34 g. of the prereduced catalyst described in Example 10. The reaction tube was encased in an oil-filled jacket in which was also provided an absorption tower. The liquid feed of reactants were led to the top of this tower and hydrogen to its bottom. From the bottom the reactant mixture, saturated wih hydrogen, was led into the reaction tube. The oil in the jacket was heated to the required temperature, 225° C. The tube from the reactor was equipped with a cell for measuring the electrical conductivity of the effluent. The presence of gas bubbles could thus be indicated. The reaction mixture consisted of 56.5% ammonia, 40.5% monoethanolamine and 3.0% water (all by weight). The molar proportion of ammonia to monoethanolamine was 5:1. By means of a metering pump the feed rate was kept at 400 g. per hour. The product was analyzed by means of gas chromatography as previously described and the conversion of monoethanolamine determined.

One experiment was carried out at a reaction pressure of 150 atmospheres. At the beginning of the experiment the conversion of monoethanolamine was 50%, but already after 50 hours of continuous operation the conversion had declined to 10%. The effluent was of a light yellow color. The yield of ethylenediamine counted on monoethanolamine declined from 35 to 25% while the yield of aminoethylethanolamine increased from 20 to 40%. The bubble indicator showed that the effluent was a two phase mixture of gas and liquid. Inspection of the catalyst after the experiment showed that it had been mechanically damaged and partly disintegrated.

Another experiment was carried out at a reaction pressure of 350 atmospheres. After 50 hours continuous operation the conversion of monoethanolamine during this time was unchanged 50%, the effluent was substantially one phase liquid, almost colorless, the yield of ethylenediamine on converted monoethanolamine and aminoethylethanolamine was constant 35% and 30% respectively. No disintegration of the catalyst was observed.

This comparison thus demonstrates the advantage of carrying out the reaction at a high pressure.

EXAMPLE 17

An apparatus for continuous reactions was used, similar to that of Example 13, but with a reaction tube of 160 cm. length and an inner diameter of 8.8 mm., charged with 100 g. of prereduced catalyst described in Example 10. An injector for adding hydrogen was substituted for the absorption tower mentioned in Example 13. It consisted of a narrow tube, welded into the lower part of the vertical, heated feed tube to the reactor.

The feed rate was kept at 560 g. per hour of mixture of 68.0% (by weight) ammonia, 28.4% monoethanolamine, and 3.6% water. The molar proportion of ammonia to monoethanolamine was 8.6:1. The amount of hydrogen was 60 l./hour, measured at atmospheric pressure. The reaction temperature was 225° C. and the reaction pressure 280 atmospheres.

The experiment was run continuously for 350 hours. The conversion of monoethanol amine was practically constant and amounted to about 55%. The yields of the various products, counted on converted monoethanolamine, were also practically constant throughout the whole run. The following yields were obtained: ethylenediamine 60%, piperazine 12%, diethylenetriamine 7%, aminoethylethanol amine 12%, aminoethylpiperazine 2%, and hydroxyethylpiperazine 2%. The product was essentially colorless.

Having regard to the foregoing disclosure, the following is claimed as the inventive and patentable embodiments thereof:

1. A process for the catalytic conversion of aliphatic alcohols selected from the group consisting of saturated aliphatic alcohols having from one to about thirty carbon atoms, saturated aliphatic aminoalcohols having from two to about thirty carbon atoms, and mixtures thereof, to aliphatic amines and piperazine and aminoalkyl piperazines by reaction with ammonia, which comprises carrying out the reaction of the alcohol and ammonia in a molar ratio of ammonia to alcohol within the range from about 1:1 to about 20:1 at an elevated temperature within the range from about 150° to about 350° C. under a pressure within the range from about 80 to about 400 atmospheres in the presence of hydrogen and in the presence of a catalyst consisting essentially of iron and at least member selected from the group consisting of nickel and cobalt and mixtures thereof, in a molar ratio Fe:Ni/Fe:Co/Fe:Ni+Co within the range from about 90:10 to about 10:90.

2. A process according to claim 1 wherein the reaction is carried out at a temperature within the range from about 200° to about 275° C.

3. A process according to claim 1, wherein the reaction is carried out at a pressure within the range from about 100 to about 350 atmospheres.

4. A process according to claim 1 in which the catalyst is supported on a carrier.

5. A process according to claim 4 wherein the carrier is aluminum oxide.

6. A process according to claim 1 in which the catalyst consists essentially of a mixture of iron and nickel.

7. A process according to claim 6 wherein the catalyst includes an aluminum oxide carrier.

8. A process according to claim 1 in which the catalyst consists essentially of a mixture of iron and cobalt.

9. A process according to claim 8 wherein the catalyst includes an aluminum oxide carrier.

10. A process according to claim 1 in which the catalyst consists essentially of a mixture of iron, nickel and cobalt.

11. A process according to claim 10 wherein the catalyst includes an aluminum oxide carrier.

12. A process according to claim 1 in which the catalyst is obtained by reduction to the metal in the course of the amination reaction of a mixture which consists essentially of a mixture of the oxides of iron, nickel and cobalt.

13. A process according to claim 12 wherein the catalyst is obtained by reduction to the metal in the course of the amination reaction from a mixture of oxides which includes an aluminum oxide carrier.

References Cited

UNITED STATES PATENTS

| 3,120,524 | 2/1964 | Godfrey | 260—268 |
| 3,270,059 | 8/1966 | Winderl et al. | 260—583 |

ALEX MAZEL, Primary Examiner

R. V. RUSH, Assistant Examiner

U.S. Cl. X.R.

260—584 R, 585 B